United States Patent [19]

Peché

[11] 4,015,720
[45] Apr. 5, 1977

[54] COUPLING DEVICE FOR PNEUMATIC BRAKE LINES

[75] Inventor: Jack Peché, Johannesburg, South Africa

[73] Assignee: Achille George Richman, London, England; a part interest

[22] Filed: Oct. 28, 1975

[21] Appl. No.: 626,701

[30] Foreign Application Priority Data

Oct. 28, 1974 South Africa .................... 74/6799
Oct. 28, 1974 South Africa .................... 74/6799A

[52] U.S. Cl. ............................. 213/1.3; 188/112; 213/76; 303/48
[51] Int. Cl.² ........................................ B60T 7/12
[58] Field of Search ........................ 303/49, 48, 89; 188/112, 170, 3, 124, 125, 127, 149; 213/1.3, 76, 45, 43

[56] References Cited

UNITED STATES PATENTS

| 2,989,152 | 6/1961 | Butler .............................. 303/49 X |
| 3,591,017 | 7/1971 | Cope et al. ......................... 213/76 |
| 3,650,570 | 3/1972 | Meeks ............................. 303/49 X |
| 3,754,623 | 8/1973 | Gatt ................................ 188/112 |
| 3,834,767 | 9/1974 | Bullinger ....................... 188/112 X |

Primary Examiner—Trygve M. Blix
Assistant Examiner—Douglas C. Butler
Attorney, Agent, or Firm—Young & Thompson

[57] ABSTRACT

Apparatus for automatically coupling pneumatic brake lines on railway wagons and other articulated vehicles. The apparatus comprises an axially and resiliently compressible tubular projection which is fitted to the end of the vehicle to extend outwardly beyond the coupling plane of the vehicle. The head at the free end of the projection is formed to align and connect airtightly with a similarly formed head at the free end of a like formation on an adjacent vehicle when the draw-gear of the vehicles is coupled. This action compresses each projection thereby opening a valve between the bore of the projection and the brake line of its associated vehicle. The valve is releasably locked in the open position so that if the vehicles are uncoupled deliberately or accidentally, air in the brake line will be dissipated thus applying the brakes of the vehicle.

13 Claims, 5 Drawing Figures

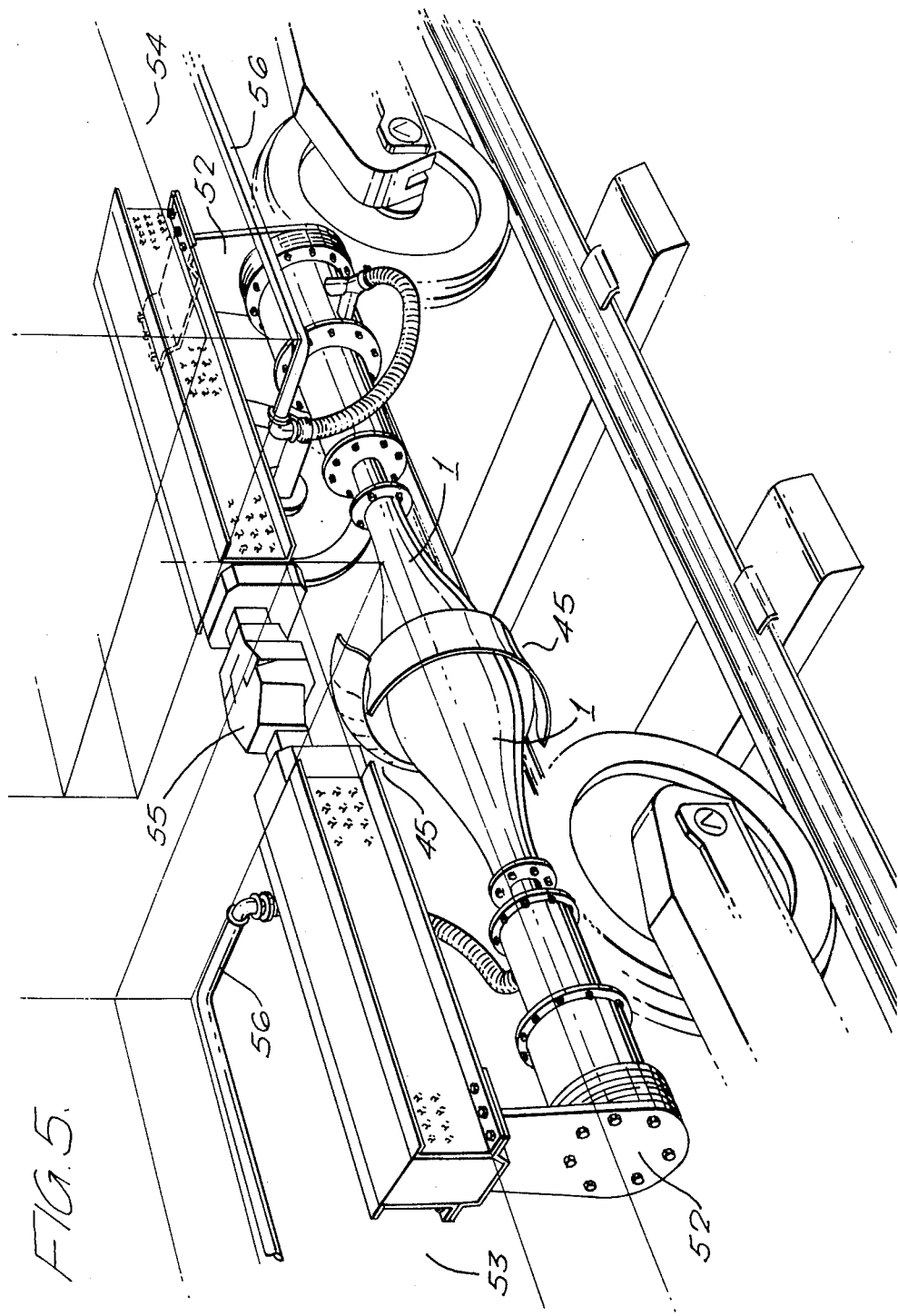

COUPLING DEVICE FOR PNEUMATIC BRAKE LINES

This invention relates to apparatus for coupling pneumatic brake lines of vehicles. The apparatus is particularly useful for coupling brake lines of railway rolling stock but may also be used equally effectively with other articulated vehicles employing draw-gear and pneumatic, vacuum or servo-assisted vacuum brakes.

In this specification the term "pneumatic brake lines" includes brake lines used in conjunction with braking systems operated by compressed air or vacuum.

It is an object of this invention to provide apparatus for automatically coupling the brake lines of adjacent vehicles. The apparatus of the invention is of simple construction and easy to service. Additionally it includes a "fail-safe" mechanism to ensure that if there is a rupture in the brake line the brakes will automatically be applied. The coupling unit of the apparatus of the invention attached to each adjacent vehicle is of identical construction thus obviating the problems attendant upon the alignment and coupling of complemental units of different mating formations. The apparatus provides means for the alignment and airtight sealing of the coupling even when the units on adjacent vehicles are out of register such as, for example, when they are unevenly loaded or when they are being coupled on a curved section of track. Additionally, the apparatus of the invention provides a substantially straight unimpeded passage between the brake lines of adjacent vehicles thus forming a saving in material and obviating a throttling effect which might otherwise be caused by a tortuous passage.

Apparatus for coupling pneumatic brake lines of vehicles according to the invention includes an axially and resiliently compressible tubular projection attachable to a vehicle to extend outwardly parallel to the vehicle draught axis, a valve for controlling flow of air between the brake line of the vehicle and the bore of the projection which valve is so biased that it is closed when the projection is fully extended and open when the projection has been axially compressed to a predetermined extent and a head at the free end of the projection formed to align and connect substantially airtightly with a similarly formed head of a projection of like apparatus attached to an adjacent vehicle when the draw-gear of the vehicles is coupled, which coupling compresses the projection to the predetermined extent.

In a preferred form the invention means are provided releasably to lock the valve in the open position.

According to one embodiment of the invention part of the projection is a cylindrical housing and part of the bore of the projection is defined by a rigid tube slidable axially into the housing against the action of a spring, the head of the projection being connected to the tube. The valve is preferably a piston located within the housing and biased to a first position where it occludes a port between the brake line and the bore of the projection and movable to a second position where it is clear of the port.

According to a further embodiment of the invention the head of the projection is formed with a nose adapted to enter the mouth of the bore in the head of the opposing projection. In this form of the invention the nose is secured at its base to part of the mouth of the bore and tapers as it extends outwardly to its tip.

According to yet a further aspect of the invention the head of the projection is formed with a flared guide around substantially but not more than half of its periphery. Preferably the nose and the flared guide are disposed on opposite sides of the bore of the projection.

In yet a further embodiment of the invention the head of the projection is supported by a neck which is resiliently flexible.

The head of the projection may carry electrical terminals adapted to make contact with corresponding terminals on the head of the opposing projection.

The invention will now be described by way of example only with reference to the accompanying drawings which illustrate apparatus suitable for the coupling of brake lines of railway rolling stock employing a braking system operable by compressed air. The invention is not, however, limited to such an application.

In the drawings:

FIG. 5 is a perspective part sectional view of the adjacent end zones of two railway wagons illustrating both the draw gear and the apparatus of the invention in the coupled position.

Figure 1:
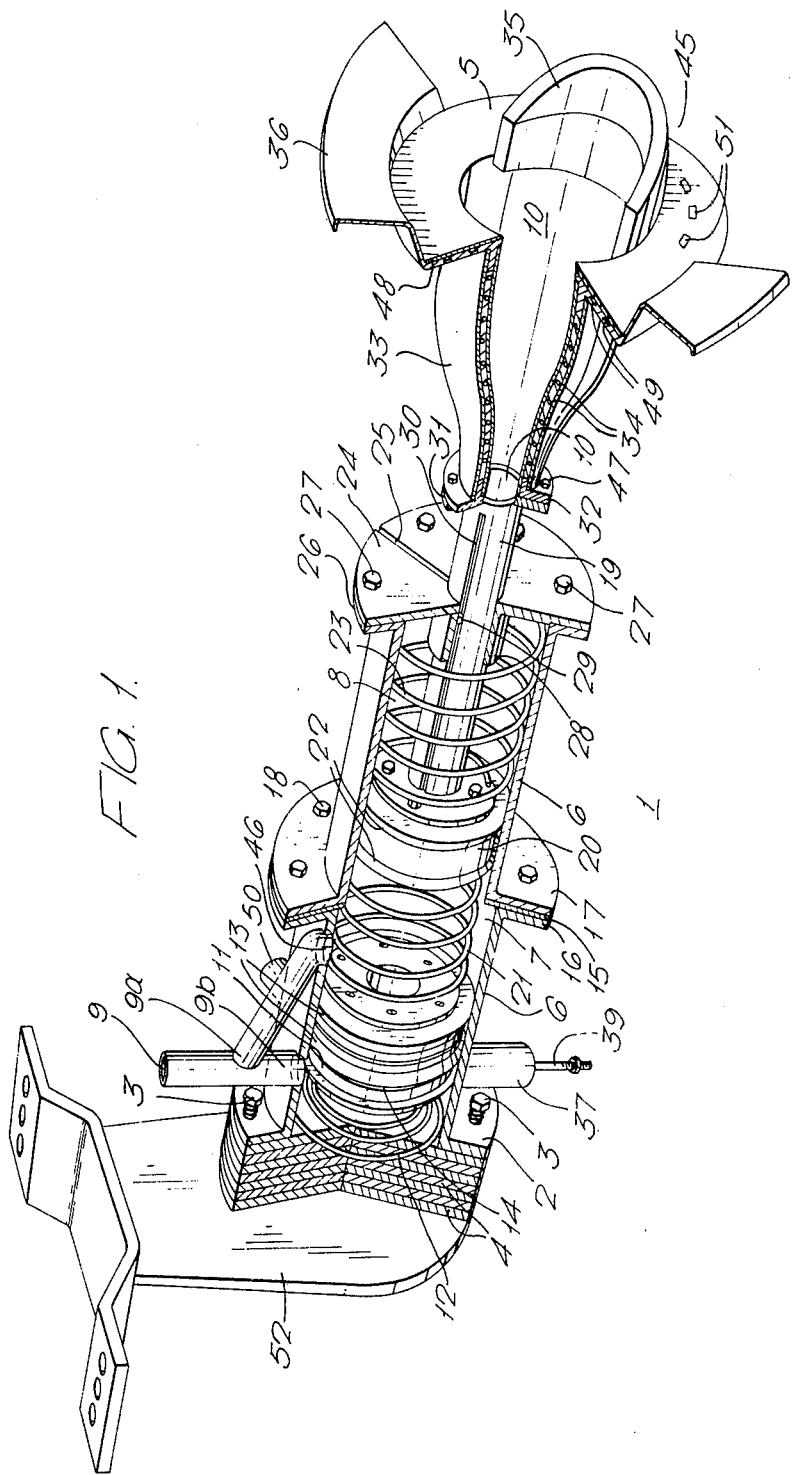
FIG. 1 illustrates a perspective part sectional view of the apparatus.
Figure 2:
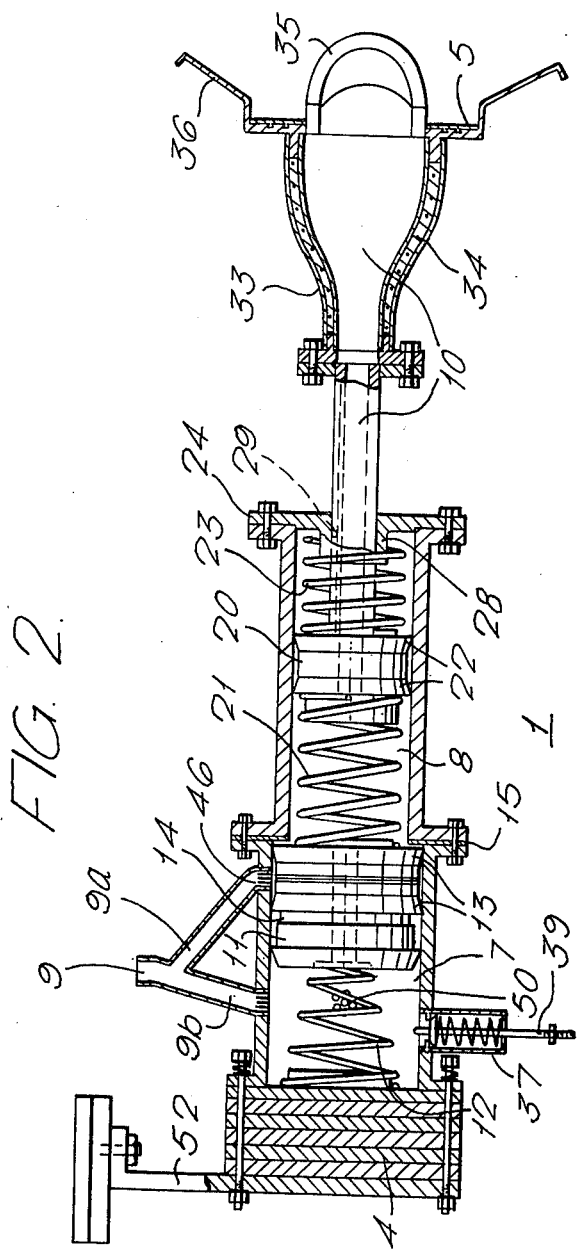
FIG. 2 is a schematic sectional side elevation of the apparatus as it would appear in the uncoupled position with the "fail-safe" mechanism in the inoperative condition.
Figure 3:
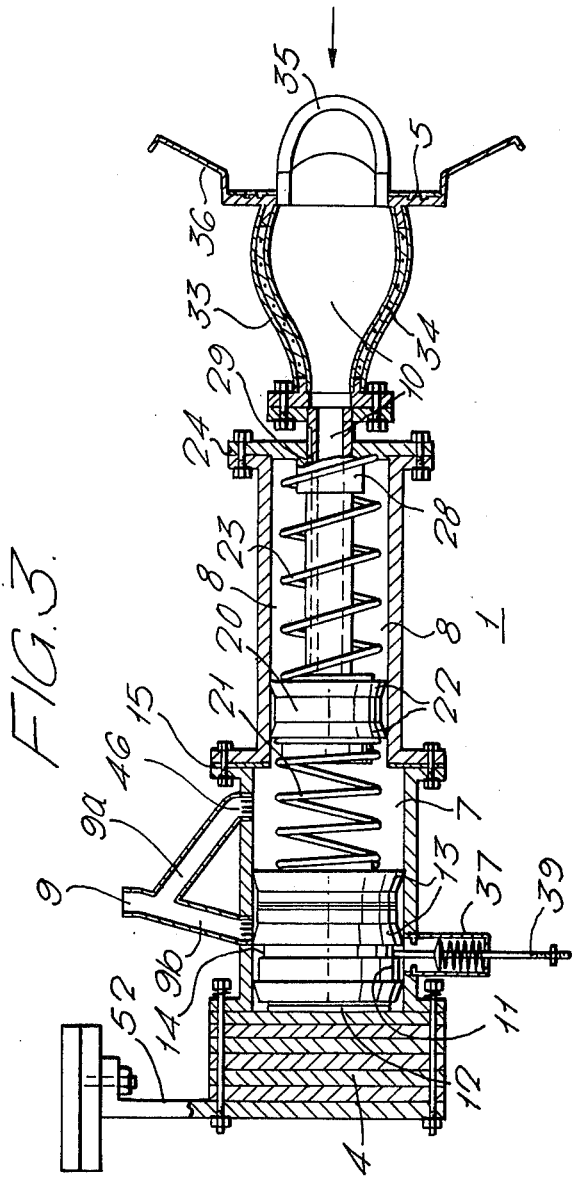
FIG. 3 is a schematic sectional side elevation of the apparatus as it would appear in the coupled position.

Referring first to FIGS. 1, 2 and 3 of the drawings a unit of the apparatus as illustrated is attachable to each end of a railway wagon (as illustrated in FIG. 5) by means of a bracket 52. The apparatus includes an axially and resiliently compressible tubular projection 1 which is secured to the bracket 52 at its base 2 by means of bolts 3. A number of spacer buffer pads 4 are located between the base 2 and the bracket 52. The projection 1 of the apparatus is so attached to the wagon that it extends outwardly parallel to the wagon draught axis. Conveniently the projection 1 may be located below the conventional draw-gear of the wagon. When fully extended as illustrated in FIG. 2 the face 5 of the head 45 at the free end of the projection 1 extends beyond the coupling plane of the draw-gear of the wagon. The projection 1 is supported by a cylindrical housing generally designated 6 which defines a valve chamber 7 and a tube chamber 8 which are in communication with each other. The valve chamber 7 is of greater diameter than the tube chamber 8.

The brake line 56 of each wagon 53 and 54 (as shown in FIG. 5 only) is adapted to be coupled to a bifurcated pipe 9 which is communicable with the bore 10 of the projection 1 through one leg of the pipe 9A and a port 46. A valve piston 11 is biased to the position illustrated in FIG. 2 by means of a conical spring 12 and in this position the valve piston 11 occludes the port 46. The valve piston 11 has two outwardly facing external distributor seals 13 and an annular groove 14. When the valve piston 11 is in the position as illustrated in FIG. 2 the peripheral zone of its outer face is urged into contact with an annular seal 15 which is clamped between flanges 16 and 17 of the valve chamber 7 and the tube chamber 8 respectively by means of bolts 18.

A tube 19 extends into the tube chamber 8 where it is connected to a sealing piston 20 which has a centrally disposed hole forming part of the bore 10 of the projection 1. A main spring 21 is located within the housing 6 between the valve piston 11 and the sealing piston 20. A pair of outwardly facing external distributor seals 22 prevents leakage of air between the sealing piston 20 and the wall of the tube chamber 8. A buffer spring 23 is located between the outer face of the sealing piston 20 and the end plate 24 of the tube housing 8. The end plate 24 which has a diametrical split 25 is secured to a flange 26 at the outer end of the tube chamber 8 by means of bolts 27. The purpose of the diametrical split 25 in the end plate 24 is to facilitate the removal of the sealing piston 20 for cleaning and maintenance purposes. The tube 19 is supported by a bush 28 which is integral with the end plate 24. The bush 28 may be brass lined to increase wear resistance. A pin 29 protrudes from the bush 28 into a longitudinal groove 30 which extends along the length of the tube 19. By this means the head 45 at the free end of the projection 1 is restrained from turning about its long axis thus ensuring that it will mate with the head at the free end of the opposing projection. The outer end of the tube 19 is formed with a flange 31 which is adapted to be secured by means of bolts 47 to a complemental flange 32 forming part of the neck 33 of the projection 1. The neck 33 which is of bell shaped configuration is constructed from layers of rubber and nylon plies reinforced internally by a spring wire 34. The rubber plies of the neck 33 are vulcanized. The face 5 of the head 45 has a detachable seal 48 keyed into grooves 49 and adapted to form an airtight seal with a similar face on the head of an opposing projection.

The head 45 of the projection 11 is formed with a nose 35 which is secured at its base to part of the mouth of the bore 10 and which tapers as its extends outwardly to its tip. The head 45 of the projection 1 is also formed with a flared guide 36. As will be seen from FIG. 1 the nose 35 and the flared guide 36 are disposed on opposite sides of the mouth of the bore 10 of the projection 1.

Figure 4:
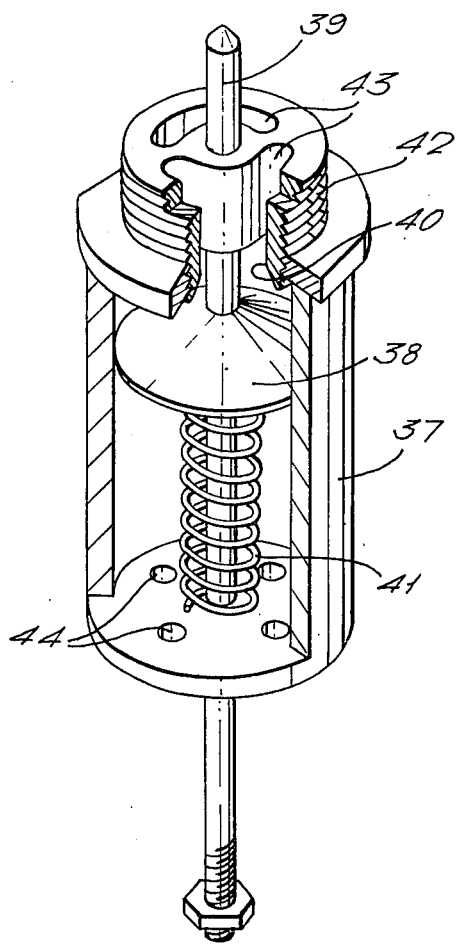
FIG. 4 is a perspective part sectional view of the locking mechanism for the valve of the apparatus.

Referring to FIGS. 1, 2 and 3 a locking mechanism for the valve piston 11 is contained within a housing 37 which is secured to the wall of the valve chamber 7. The detail of the locking mechanism for the valve piston 11 is illustrated in FIG. 4. The housing 37 contains a closure member 38 of lesser diameter than the internal diameter of the housing 37. The closure member 38 is attached to a pin 39 and is biased into sealing relationship with a seat 40 by means of a spring 41. The housing 37 is formed with a threaded neck 42 which is adapted to be screwed into the wall of the valve chamber 7 as shown in FIGS. 1, 2 and 3 so that the head of the pin 39 extends into the chamber 7. The threaded neck 42 has ducts 43 which form an effective communication between the valve chamber 7 and the inside of the housing 37 when the closure member is displaced from its seat 40 as illustrated in FIG. 4. The base of the housing 37 has a number of holes 44. According to this arrangement any moisture forming within the valve chamber 7 may be evacuated by withdrawing the closure member 38 from its seat 40. The moisture thus drops or flows through the ducts 43 into the housing 37 and is discharged through the holes 44.

The apparatus will now be described in use. When the projection 1 is in the fully extended position as illustrated in FIG. 2 the valve piston 11 occludes the port 46 between the brake line (not shown) and the bore 10 of the projection 1.

When two wagons are brought together the tips of the noses 35 on opposing projections serve to assist the alignment and mating of the heads of the two projections. If the heads of the opposing projections are substantially misaligned the tip of the nose 35 of one projection will impinge against the flared guide 36 of the opposing projection. Because of the flexibility of the neck 33 of the projections the heads 45 are brought into alignment as the wagons approach and the nose 35 of each projection enters the mouth of the bore 10 of its mate. The flared guide 36 which is hemicylindrical at its point of attachment to the periphery of the face 5 is so disposed that when the heads of opposing projections are brought into sealing relationship with each other the juxtaposed edges of the flared guides interengage and the free peripheral zone of each head 45 engages with the opposing internal wall of the hemicylindrical section of the flared guide 36. This internal and external inter-engaging relationship between the heads 45 ensures a high resistance to rupture by lateral forces generated by the motion of the adjacent wagons. This resistance is greatly enhanced by disposing the nose 35 and the flared guide 36 on opposite sides of a vertical plane which passes through the longitudinal axis of the bore 10.

As previously stated when the projection 1 is fully extended its face 5 extends beyond the coupling plane of the draw-gear of the wagon. When the adjacent wagons are brought together the face 5 on the head 45 of the projection 1 engages with the face on the opposing projection. This action urges the tube 19 axially into the housing 6 which pushes the main spring 21 against the valve piston 11 which in turn acts against the conical spring 12. In FIG. 1 the valve piston 11 is shown at a point midway between its closed and open positions. As the conical spring 12 is lighter than the main spring 21 it collapses and the valve piston 11 is urged to the back of the housing 6 as shown in FIG. 3.

As the valve piston 11 is urged backwards its then leading edge which is chamfered impinges against the head of the pin 39 which is thus depressed in its housing 37 against the action of the spring 41. As the valve piston 11 moves to the back of the housing 6 the head of the pin 39 is urged into locking engagement with the annular groove 14 by the action of the spring 41. Further movement of the head 45 of the projection 1 is absorbed by the compression of the main spring 21. After the draw-gear of the vehicles has been coupled the tube 19 is urged outwardly by the action of the main spring 21 which forces the faces 5 of the opposing projections together into airtight relationship thus effectively coupling the brake lines of the adjacent vehicles. At this stage the projection 1 will be axially compressed as shown in FIG. 3. It will also be noted from this Figure that the valve piston 11 is clear of the port 46 thus allowing air to pass between the brake line and the bore 10 of the projection 1 into the bore of the mated projection and the brake line of its associated vehicle.

When the coupled wagons are in motion they are apt to move slightly relative to each other and this movement is taken up by the inherent resistance of the projection.

When the draw-gear of the wagons is disconnected the faces 5 of the opposing projections will come apart. As the head of the pin 39 of the locking mechanism is still at this stage engaged in the annular groove 14 of the valve piston 11 air from the brake line is vented to atmosphere through the port 46 and the mouth of the bore 10 of the projection 1 thus applying the brakes of the uncoupled wagons. Similarly if the wagons should be accidentally uncoupled when in motion the brakes will automatically be applied. Thus the apparatus of the invention provides a "fail-safe" system of coupling brakes.

During shunting and other operations it may be desirable that instead of applying the brakes by venting the compressed air to atmosphere it should be retained within the reservoir of the vehicle. This may be achieved by the operation of the locking mechanism contained within the housing 37 for the valve piston 11. If the outer end of the pin 39 is pulled down by an operator and held in that position until the draw-gear of the vehicles is uncoupled and then released the apparatus will adopt the position as illustrated in FIG. 2. This action causes the head of the pin 39 to disengage from the annular groove 14 of the valve piston 11 which is urged outwardly under the influence of the conical spring 12 until it abuts against the annular seal 15 thus pushing the sealing piston 20 outwardly thereby compressing the buffer spring 23 which is lighter than the conical spring 12. The valve piston 11 thus occludes the port 46 between the brake line of the vehicle and the bore 10 of the projection 1. In this way compressed air is retained in the reservoir of the wagon. The compressed air within the reservoir may be vented to atmosphere by the simple expedient of operating the outer end of the pin 39 so that the closure member 38 is displaced from its seat 40. In this way the brakes of the wagon may be applied at will, either intermittently or continuously until the compressed air in the reservoir has been dissipated.

The locking mechanism within the housing 37 also serves an additional purpose in the case of wagons employing compressed air brake systems. It sometimes occurs in such systems that the pressure within the brake line increases to an excessive amount. By the utilisation of a spring 41 of suitable tension such excess pressure will be vented automatically to atmosphere by displacing the closure member 38 from its seat 40.

Means are provided for the coupling of the brake line of a wagon fitted with the apparatus of the invention to a wagon which is not so fitted but which has a conventional flexible brake line hose coupling. This aspect of the invention will be more clearly seen from FIG. 2 of the accompanying drawings. In this arrangement the valve piston 11 is permanently positioned at the forward end of the valve chamber 7 thus effectively occluding the port 46 between the brake line of the vehicle and the bore 10 of the projection 1. According to this arrangement the conventional flexible hose coupling of the adjacent vehicle is connected to a normally closed and sealed duct 50 through the wall of the valve chamber 7. In this arrangement the duct 50 is, of course, permanently open so that compressed air from the wagon fitted with the apparatus of the invention passes into the valve chamber 7 through the pipe 9 and the leg 9B, then through the duct 50 into the conventional flexible hose coupling (not shown) of the adjacent vehicle not fitted with the apparatus of the invention.

Electrical terminals 51 are located on the face 5 so as to make contact with corresponding terminals on the face of the opposing projection.

In FIG. 5 of the accompanying drawings the adjacent zones of two railway wagons designated respectively 53 and 54 are illustrated with both the conventional draw-gear 55 and the apparatus of the invention in the coupled position. The apparatus of the invention is attached to the end of each wagon below the level of the draw-gear 55 by means of a bracket 52. In the coupled position as illustrated in this Figure, the projection 1 attached to each wagon 53 and 54 has been axially compressed in the manner previously described. The unit of apparatus secured to the wagon 53 is substantially identical to the unit of apparatus attached to the adjacent vehicle 54. The projection 1 attached to wagon 53 has a head 45 at its free end which is connected substantially air tightly with a similarly formed head 45 of the opposing projection 1 attached to the wagon 54.

The brake line 56 of each wagon 53 and 54 is coupled to a bifurcated pipe 9 which is communicable with the bore 10 (as shown in FIG. 1) of its associated projection 1.

I claim:

1. Apparatus for coupling pneumatic brake lines of vehicles comprising: an axially and resiliently compressible tubular projection attachable to a vehicle to extend outwardly parallel to the vehicle draught axis to its free end; a valve for controlling flow of air between a brake line of the vehicle and the bore of the projection;

means to bias the valve so that it is closed when the projection is fully extended and open when the projection has been axially compressed to a predetermined extent; and a head at the free end of the projection formed to align and connect substantially airtightly with a similarly formed head of an opposing projection of like apparatus attached to an adjacent vehicle when the vehicles are coupled, which coupling action compresses both projections to the predetermined extent.

2. The apparatus of claim 1 in which means are provided releasably to lock the valve in the open position.

3. The apparatus of claim 1 in which part of the projection is a cylindrical housing and part of the bore of the projection is defined by a rigid tube slidable axially into the housing against the action of a spring, the head at the free end of the projection being connected to the tube.

4. The apparatus of claim 3 in which the valve is a piston located in the housing, biased to a first position where it occludes a port between the brake line and the bore of the projection and movable to a second position where it is clear of the port.

5. The apparatus of claim 1 in which the head at the free end of the projection is formed with a mouth which defines the bore of the projection and a nose adapted to enter the mouth of the bore in the head of the opposing projection.

6. The apparatus of claim 5 in which the nose is secured at its base to part of the mouth of the bore and tapers as it extends outwardly to its tip.

7. The apparatus of claim 1 in which the head at the free end of the projection is formed with a flared guide around substantially but not more than half of its periphery.

8. The apparatus of claim 7 in which the nose and the flared guide are disposed on opposite sides of the mouth of the bore.

9. The apparatus of claim 1 in which the head at the free end of the projection is supported by a neck which is resiliently flexible.

10. The apparatus of claim 1 in which the head at the free end of the projection carries electrical terminals adapted to make contact with corresponding terminals on the head of the opposing projection.

11. The apparatus for coupling pneumatic brake lines of vehicles comprising:
 a. a tubular projection attachable to a vehicle to extend outwardly parallel to the vehicle draught axis, which projection comprises:
   i. a cylindrical housing;
   ii. a rigid tube slidable axially into the housing against the action of a spring; and
   iii. a resiliently flexible neck connected to the tube;
 b. a valve for controlling flow of air between a brake line of the vehicle and the bore of the projection, which valve comprises:
   i. a piston located within the housing; and
   ii. a port between the brake line and the bore of the projection;
 c. means to bias the piston to occlude the port when the projection is fully extended and to clear the port when the projection has been axially compressed to a predetermined extent which means comprises a spring located within the projection; and
 d. a head supported by the neck and formed to align and connect substantially airtightly with a similarly formed head of an opposing projection of like apparatus attached to an adjacent vehicle when the vehicles are coupled, which coupling action compresses both projections to the predetermined extent.

12. The apparatus of claim 11 in which means are provided releasably to lock the piston in a position clear of the port.

13. The apparatus of claim 12 in which the means to lock the piston in a position clear of the port is a spring loaded pin adapted to engage with an annular groove in the piston.

* * * * *